US012771252B2

(12) United States Patent
Wang

(10) Patent No.: US 12,771,252 B2
(45) Date of Patent: Oct. 20, 2026

(54) CURRENT OUTPUT DEVICE, METHOD, APPARATUS AND SYSTEM, AND MEDIUM

(71) Applicant: SUZHOU METABRAIN INTELLIGENT TECHNOLOGY CO., LTD., Suzhou (CN)

(72) Inventor: Lupan Wang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/720,945

(22) PCT Filed: Sep. 29, 2022

(86) PCT No.: PCT/CN2022/122393
§ 371 (c)(1),
(2) Date: Jun. 17, 2024

(87) PCT Pub. No.: WO2023/245902
PCT Pub. Date: Dec. 28, 2023

(65) Prior Publication Data
US 2025/0147529 A1 May 8, 2025

(30) Foreign Application Priority Data
Jun. 24, 2022 (CN) ........................ 202210720899.9

(51) Int. Cl.
*H02M 3/158* (2006.01)
*G05F 1/613* (2006.01)
*G05F 1/62* (2006.01)

(52) U.S. Cl.
CPC .......... *H02M 3/1584* (2013.01); *G05F 1/613* (2013.01); *G05F 1/62* (2013.01); *H02M 3/1582* (2013.01)

(58) Field of Classification Search
None
See application file for complete search history.

(56) References Cited

U.S. PATENT DOCUMENTS 7,596,706 B2 * 9/2009 Fuseya .................. G11C 5/147 713/300
7,960,951 B2 * 6/2011 Southwell .......... H02M 3/1584 323/283
(Continued)

FOREIGN PATENT DOCUMENTS

CN 108306490 A 7/2018
CN 109361311 A 2/2019
(Continued)

*Primary Examiner* — Thomas J. Hiltunen
(74) *Attorney, Agent, or Firm* — IPro, PLLC

(57) ABSTRACT

Disclosed are a current output device, method, apparatus and system, and a medium. A multi-channel detection module in the device is connected to a plurality of single-phase power supply chips to transmit temperature values and current values of the chips, and at least one chip is different from other chips in type. A system control module has one end connected to the multi-channel detection module, to obtain constraint based on pre-collected related parameters to adjust the current values. A variable current compensation module is connected to the other end of the system control module to obtain an output current value of each chip and output a current. The system control module acquires the temperature values and the current values obtains the constraint, and adjusts the current values according to the constraint, and the output current value of each chip is obtained and the current is output.

17 Claims, 4 Drawing Sheets

(56) References Cited

U.S. PATENT DOCUMENTS

| | | | | |
|---|---|---|---|---|
| 9,568,969 | B2 * | 2/2017 | Yamanaka | G06F 1/263 |
| 10,454,465 | B2 * | 10/2019 | Tajima | G01K 3/14 |
| 10,511,227 | B2 * | 12/2019 | Tano | H01M 8/04895 |
| 10,680,507 | B2 * | 6/2020 | Tang | H05K 7/20909 |
| 11,228,248 | B1 * | 1/2022 | Zafarana | H03K 5/08 |
| 11,522,459 | B2 * | 12/2022 | Petricek | H02M 3/1584 |
| 11,791,705 | B1 * | 10/2023 | Chang | H02M 1/0041<br>363/65 |
| 12,348,143 | B2 * | 7/2025 | Grisamore | G06F 1/28 |
| 2003/0006650 | A1 * | 1/2003 | Tang | H02J 1/102<br>307/43 |
| 2011/0025292 | A1 * | 2/2011 | Huang | H02J 1/102<br>323/318 |
| 2022/0345126 | A1 * | 10/2022 | Harriman | H02M 3/158 |

FOREIGN PATENT DOCUMENTS

| | | | |
|---|---|---|---|
| CN | 111596749 | A | 8/2020 |
| CN | 112671081 | A | 4/2021 |
| CN | 113285591 | A | 8/2021 |
| CN | 113595395 | A | 11/2021 |
| CN | 114815946 | A | 7/2022 |
| EP | 2290794 | A1 | 3/2011 |

* cited by examiner

CURRENT OUTPUT DEVICE, METHOD, APPARATUS AND SYSTEM, AND MEDIUM

CROSS REFERENCE TO RELATED APPLICATION

The present application claims the priority of the Chinese patent application 202210720899.9 titled "CURRENT OUTPUT DEVICE, METHOD, APPARATUS AND SYSTEM, AND MEDIUM" filed in China National Intellectual Property Administration on Jun. 24, 2022, which is incorporated herein by reference in their entirety.

TECHNICAL FIELD

The present application relates to the field of circuit control technology, and in particular to a current output device, a method, an apparatus and a system, and a medium.

BACKGROUND

In the era of big data, higher requirements have been put forward for the reliability and operating efficiency of a storage system. In order to meet the efficient and safe operating requirements of the storage system, the requirements for the method for equalizing the current applied to the storage motherboard increase accordingly. In order to meet the operating efficiency of the storage system, in the current hardware design of the storage system, a high-power load is often used to improve the system performance. In order to ensure the safety and reliability of the high-power load, multi-phase power supplies are used to supply power to the high-power load. However, due to high cost of the multi-phase power supplies, multiple single-phase power supply chips in parallel are used to supply power to the high-power load, and multiple single-phase power supply chips are of the same type. When types of power supply chips are different, power supply chips cannot operate, which limits usage scenarios of the existing current equalization circuit and reduces the user experience.

In view of the above problem, when a plurality of single-phase power supply chips in parallel are used to supply power to high-power loads, it is a skill in the art to seek how to improve the user experience without being restricted by usage scenarios when the types of power supply chips are different is a problem that those skilled in the art are trying their best to solve.

SUMMARY

An objective of the present application is to provide a current output device, a method, an apparatus, a system and a medium, which may improve user experience without being restricted by usage scenarios when types of power supply chips are different.

In order to solve the above technical problem, the present application provides a current output device, including: a plurality of single-phase power supply chips, a multi-channel detection module, a system control module and a variable current compensation module; where:

the multi-channel detection module is connected to temperature pins and current pins of the plurality of single-phase power supply chips, and is configured for transmitting current temperature values and current current values of the plurality of single-phase power supply chips, and at least one of the plurality of single-phase power supply chips is of a type different from the other single-phase power supply chips;

one end of the system control module is connected to the multi-channel detection module, and is configured for obtaining the current temperature values and the current current values, obtaining constraints based on pre-collected relevant parameters and adjusting the current current values based on the constraints, and the variable current compensation module is connected to the other end of the system control module, and is configured for obtaining an output current value of each single-phase power supply chip based on the current current values, and outputting a current of each single-phase power supply chip based on the output current value.

In the embodiments of the present application, the variable current compensation module includes a variable current circuit, a compensation circuit and an inductor, a first terminal of the inductor is connected to an output pin of each single-phase power supply chip, a second terminal of the inductor is connected to a first input of the variable current circuit, a second input of the variable current circuit is connected to an output pin of each single-phase power supply chip, an output of the variable current circuit is connected to a load, a first input of the compensation circuit is connected to an output pin of each single-phase power supply chips, a second input of the compensation circuit is connected to the first input of the variable current circuit, the first output of the compensation circuit is connected to the load, and a second output of the compensation circuit is connected to a feedback pin of each single-phase power supply chip.

In the embodiments of the present application, the variable current circuit includes a current sensing resistor, a first resistor, a second resistor, a third resistor, a first switch tube and a first differential amplifier, a first terminal of the second resistor serves as the first input of the variable current circuit, a first terminal of the first resistor serves as the second input of the variable current circuit, a second terminal of the first resistor is connected to a non-inverting input of the first differential amplifier, a second terminal of the second resistor is connected to a positive power supply terminal of the first differential amplifier, a negative power supply terminal of the first differential amplifier is grounded, a first terminal of the third resistor is connected to an inverting input of the first differential amplifier, a second terminal of the third resistor is connected to a second terminal of the first switch tube, an output of the first differential amplifier is connected to a driving terminal of the first switch tube, the first terminal of the second resistor is connected to a first terminal of the first switch tube, the second terminal of the first switch tube is connected to a first terminal of the current sensing resistor, and a second terminal of the current sensing resistor serves as the output of the variable current circuit.

In the embodiments of the present application, the compensation circuit includes a fourth resistor, a capacitor and a second differential amplifier, a non-inverting input of the second differential amplifier serves as the first input of the compensation circuit, a first terminal of the fourth resistor serves as the second input of the compensation circuit, a common terminal formed by an inverting input of the second differential amplifier, a negative power supply terminal of the second differential amplifier and a first terminal of the capacitor is connected to a second terminal of the fourth resistor, a positive power supply terminal of the second differential amplifier is connected to a second terminal of the capacitor, the second terminal of the capacitor serves as the first output of the compensation circuit, and an output of the second differential amplifier serves as the second output of the compensation circuit.

In the embodiments of the present application, a fifth resistor and a sixth resistor are included, a first terminal of the fifth resistor is connected to a common terminal formed by the output of the variable current circuit and the first output of the compensation circuit, a second terminal of the fifth resistor is connected to a first terminal of the sixth resistor, a first terminal of the sixth resistor is connected to the second output of the compensation circuit, and a second terminal of the sixth resistor is grounded.

In the embodiments of the present application, a current limiting protection module is further included, an input of the current limiting protection module is connected to an output of the variable current compensation module, and an output of the current limiting protection module is connected to a load.

In the embodiments of the present application, the current limiting protection module includes a seventh resistor, an eighth resistor, a ninth resistor and a second switch tube, a common terminal formed by a first terminal of the seventh resistor and a first terminal of the second switch tube serves as the input of the current limiting protection module, a second terminal of the seventh resistor is connected to a common terminal formed by a driving terminal of the second switch tube and a first terminal of the ninth resistor, a second terminal of the second switch tube is connected to a first terminal of the eighth resistor, a common terminal formed by a second terminal of the eighth resistor and a second terminal of the ninth resistor serves as the output of the current limiting protection module.

In order to solve the above technical problem, the present application provides a current output method applied to the current output device, and the method includes:

collecting a current temperature value and a current current value of each single-phase power supply chip transmitted by the multi-channel detection module, wherein a plurality of single-phase power supply chips are provided, and at least one of the plurality of single-phase power supply chips is of a type different from the other single-phase power supply chips;

calling pre-collected relevant parameters of each single-phase power supply chip, wherein the relevant parameters at least include a rated temperature value and a rated current value;

establishing a constraint based on the relevant parameters;

adjusting the current current value based on the constraint;

acquiring an output current value of each single-phase power supply chip obtained by the variable current compensation module; and outputting a current of each single-phase power supply chip based on the output current value.

In order to solve the above technical problem, the present application further provides a current output apparatus, including:

a collection module configured for collecting a current temperature value and a current current value of each single-phase power supply chip transmitted by a multi-channel detection module, wherein a plurality of single-phase power supply chips are provided, and at least one of the plurality of single-phase power supply chips is of a type different from the other single-phase power supply chips;

a calling module configured for calling pre-collected relevant parameters of each single-phase power supply chip, wherein the relevant parameters at least include a rated temperature value and a rated current value;

an establishment module configured for establishing a constraint based on the relevant parameters;

an adjustment module configured for adjusting the current current value based on the constraint;

an obtaining module configured for obtaining an output current value of each single-phase power supply chip obtained by a variable current compensation module; and an output module configured for outputting a current of each single-phase power supply chip based on the output current value.

In order to solve the above technical problem, the present application also provides a current output system, including:

a memory for storing a computer program; and a processor for executing the computer program to implement steps of the current output method.

In order to solve the above technical problem, the present application also provides a non-transitory computer-readable storage medium storing a computer program which implements steps of the above current output method when executed by the processor.

The current output device provided in the present application includes the plurality of single-phase power supply chips, the multi-channel detection module, the system control module and the variable current compensation module. The multi-channel detection module is connected to temperature pins and current pins of the plurality of single-phase power supply chips, and is configured for transmitting the current temperature values and current values of the plurality of single-phase power supply chips, where at least one single-phase power supply chip is of a type different from other single-phase power supply chips. One end of the system control module is connected to the multi-channel detection module, and is configured for acquiring the current temperature values and current current values, obtaining the constraint based on pre-collected relevant parameters, and adjusting the current current based on the constraints value. The variable current compensation module is connected to the other end of the system control module, and is configured for obtaining an output current value of each single-phase power supply chip based on the current current value, and outputting a current of each single-phase power supply chip based on the output current value. Regardless of whether types of the plurality of single-phase power supply chips are the same, the system control module obtains the current temperature value and current current value through the multi-channel detection module, adjusts the current current value based on the constraint, obtains the output current value of each single-phase power supply chip through the variable current compensation module, and outputs a current equal to the output current value. When a plurality of single-phase power supply chips in parallel are used to supply power to high-power loads, user experience may be improved without being restricted by usage scenarios even if types of power supply chips are different.

The present application also provides a current output method, an apparatus, a system and a medium with the same effect as above.

BRIEF DESCRIPTION OF THE DRAWINGS

In order to more clearly illustrate the embodiments of the present disclosure, the figures that are required to describe the embodiments are briefly introduced below. Apparently, the figures described below are embodiments of the present disclosure, and a person skilled in the art may obtain other figures according to these figures without paying creative work.

Figure 1:
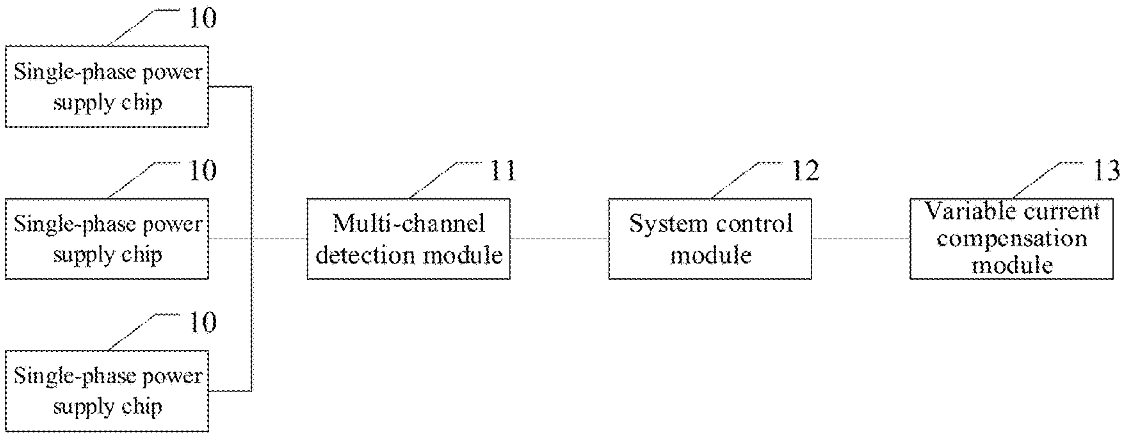
FIG. 1 is a structure diagram of a current output device provided in the present application.

In the figures: 10 single-phase power supply chip, 11 multi-channel detection module, 12 system control module, 13 variable current compensation module, 30 current limiting protection module, 40 variable current circuit, 41 compensation circuit.

DEEMPENNAGEED DESCRIPTION OF THE EMBODIMENTS

The technical solutions in the embodiments of the present application will be clearly and completely described below with reference to the accompanying drawings in the embodiments of the present application. Apparently, the described embodiments are only some of the embodiments of the present application, rather than all of the embodiments. Based on the embodiments in the present application, all other embodiments obtained by those of ordinary skill in the art without creative efforts fall within the protection scope of the present application.

The core of the present application is to provide a current output device, a method, an apparatus, a system and a medium, which may improve user experience without being restricted by usage scenarios when types of power supply chips are different.

In order to enable those skilled in the art to better understand the solution of the present application, the present application will be further described in detail below in conjunction with the accompanying drawings and embodiments.

The present application is mainly applied to a storage motherboard on which a plurality of power supply chips are provided, and the plurality of power supply chips are generally connected in parallel to supply power to a high-power load. When the plurality of power supply chips on the storage motherboard are connected in parallel to supply power to a high-power load, the present application provides a current output device, method, apparatus, system and medium. The current output device includes a plurality of single-phase power supply chips, a multi-channel detection module, a system control module and a variable current compensation module. An optimal algorithm for equalizing the current is mainly proposed in the system control module, which ensures that the single-phase power supply chips connected in parallel operate safely and reliably to provide smooth current for high-power loads through the complex programming logic device (CPLD) of the system control module provided in the storage motherboard. It reduces the risk caused by insufficient current in single-phase power supply chips ruing parallel operation, realizes power supply for high-power loads when multiple single-phase power supply chips are connected in parallel, improves the reliability of power supply of the storage motherboard, and brings more choices to the design of power supply for high-power loads, and also reduces the cost of power supply.

In the era of big data, higher requirements have been put forward for the reliability and operating efficiency of a storage system. In order to meet the efficient and safe operating requirements of the storage system, the requirements for the method for equalizing the current applied to the storage motherboard increase accordingly. In order to meet the operating efficiency of the storage system, in the current hardware design of the storage system, a high-power load is often used to improve the system performance, e.g., a PCIE switch (referring to a PCI-E switch chip, where one switch is equivalent to a combination of virtual bridge+virtual Bus) is used to expand peripheral component interconnect express (PCIE, a high-speed serial computer expansion bus standard) channel to improve the data transmission rate. In order to ensure the safe and reliable operation of high-power loads, in the board-level power supply design, a multiphase power supply which supplies power to the central processing unit (CPU) of the system control module in the storage motherboard is considered to supply power to high-power loads. However, the multiphase power supplies are expensive, and the debugging process is complex. Therefore, multiple single-phase power supplies connected in parallel are considered to supply power to high-power loads. The parallel connection of single-phase power supply chips puts high requirements on the current equalization of single-phase power supply chips. At present, only a few single-phase power supply chips in the market have active current equalization capabilities. For most single-phase power supply chips, the parallel connection process will result in uneven current flowing through each branch, which in the long run will cause excessive heat of single-phase power supply chips with high current flow, and reduce the service life of the chips. In addition, if the current distribution of the single-phase power supply chip is seriously unbalanced, it will also cause the overcurrent current single-phase power supply chips to trigger overcurrent and overtemperature protection, thus affecting the normal operation of the storage system. The plurality of single-phase power supply chips are of the same type. When power supply chip are different in type, they cannot operate, which limits usage scenarios of the existing current equalization circuit and reduces the user experience. In view of the above problem, when a plurality of single-phase power supply chips in parallel are used to supply power to high-power loads, it is a skill in the art to seek how to improve the user experience without being restricted by usage scenarios when the types of power supply chips are different is a problem that those skilled in the art are trying their best to solve.

FIG. 1 is a structure diagram of a current output device provided in the present application. As shown in FIG. 1, the current output device includes a plurality of single-phase power supply chips 10, a multi-channel detection module 11, a system control module 12 and a variable current compensation module 13. The multi-channel detection module is connected to temperature pins and current pins of the plurality of single-phase power supply chips, and is configured for transmitting the current temperature values and current values of the plurality of single-phase power supply chips. At least one single-phase power supply chip is of a type different from other single-phase power supply chips. One end of the system control module is connected to the multi-channel detection module, and is configured for acquiring the current temperature values and current current values, obtaining constraints based on pre-collected relevant parameters, and adjusting the current current values based on the constraints. The variable current compensation module is connected to the other end of the system control module, and is configured for obtaining an output current value of each single-phase power supply chip based on the current current value, and output a current of each single-phase power supply chip based on the output current value.

Figure 2:
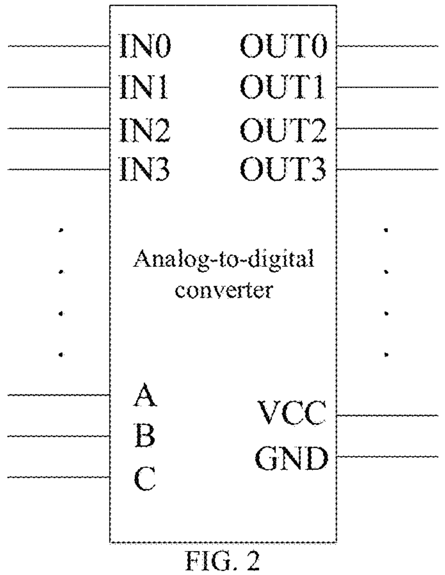
FIG. 2 is a structure diagram of a multi-channel detection module provided in the present application.

The multi-channel detection module include two parts: an electrical monitoring module and a thermal monitoring module, which monitor an IMON pin (current pin) and a VTEMP pin (temperature pin) of the single-phase power supply chip in real time, respectively, and transmit regularly obtained current temperature value and current current value to the CPLD for calculation and processing. FIG. 2 is a structure diagram of the multi-channel detection module provided in the present application. As shown in FIG. 2, the multi-channel detection module may be an analog-to-digital converter. It should be noted that the 8-channel analog-to-digital converter may collect current temperature values and current current values of 4 single-phase power supply chips during operation. When there are even N single-phase power supply chips in the current output device, 2N analog-to-digital converters are required, where N is a natural number that increases in sequence, such as 0, 1, 2, 3, . . . , N. IN0 to IN3 pins may be customized to receive the current temperature value or the current current value, and there is no limitation on what parameters each pin receives; similarly, OUT0 to OUT3 pins may be customized to output a converted digital signal of the current temperature value or a converted digital signal of the current current value, and there is no limitation on converted digital signal of what parameter is output by each pin. It should be understood that FIG. 2 only shows 4 receiving pins and 4 output pins, but it does not mean that there are only 4 receiving pins and 4 output pins.

When the current temperature value is processed in the analog-to-digital converter, for the single-phase power supply chip with its own VTEMP pin, the current temperature value is directly converted, and for the single-phase power supply chip without VTEMP pin, a thermocouple is used for temperature measurement. The thermocouple is attached to the external packaging of the single-phase power chip to collect the temperature of a single-phase power supply chip and output a voltage signal.

It should be noted that the system control module at least includes CPLD and CPU. The present application is based on state information of the single-phase power supply chip (which may be understood as state information of whether the single-phase power supply chip is in an operating state) and the current current value of the single-phase power supply chip. CPLD pre-records junction temperature and thermal resistance parameters of each power supply chip, Vds value and SOA characteristic parameters, etc., of built-in MOS tube in the power supply chip. Based on the current temperature value and current current value collected at the current moment, the most appropriate current adjustment value at the current time (i.e., the output current value) may be obtained, ensuring that the adjusted output current meets the operating requirements of high-power loads, while maximizing the service life of the single-phase power supply chip.

The variable current compensation module may directly adjust the current to the output current value obtained through the CPLD. The adjustment process is fast and accurate. The compensation module is set during the variable current process, so that the chip quickly respond to the current adjustment while maintaining stable output of the power supply. This ensures that each single-phase power supply chip may accurately and stably reach the most appropriate current value in the current state. In addition, the current limiting protection module ensures that the overcurrent protection of the single-phase power supply chip will not be triggered during the current adjustment, thereby causing cascading protection problems to other single-phase power supply chips and causing power supply failure.

In the above current output device, regardless of whether the types of the plurality of single-phase power supply chips are the same, the system control module obtains the current temperature value and current current value through the multi-channel detection module, adjusts the current current value based on the constraint, obtains an output current value of each single-phase power supply chip through the variable current compensation module, and outputs a current equal to the output current value. When a plurality of single-phase power supply chips in parallel are used to supply power to high-power loads, user experience may be improved without being restricted by usage scenarios even if types of power supply chips are different.

Figure 3:
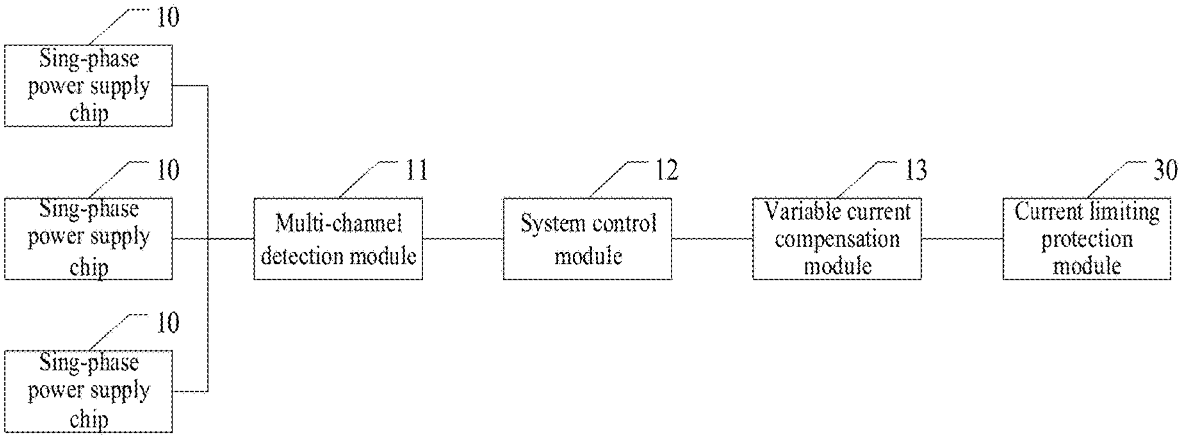
FIG. 3 is a structure diagram of another current output device provided in the present application.

FIG. 3 is a structure diagram of another current output device provided in the present application. Based on the above embodiments, as a embodiment, as shown in FIG. 3, a current limiting protection module 30 is further included.

An input of the current limiting protection module is connected to an output of the variable current compensation module, and an output of the current limiting protection module is connected to the load.

Figure 4:
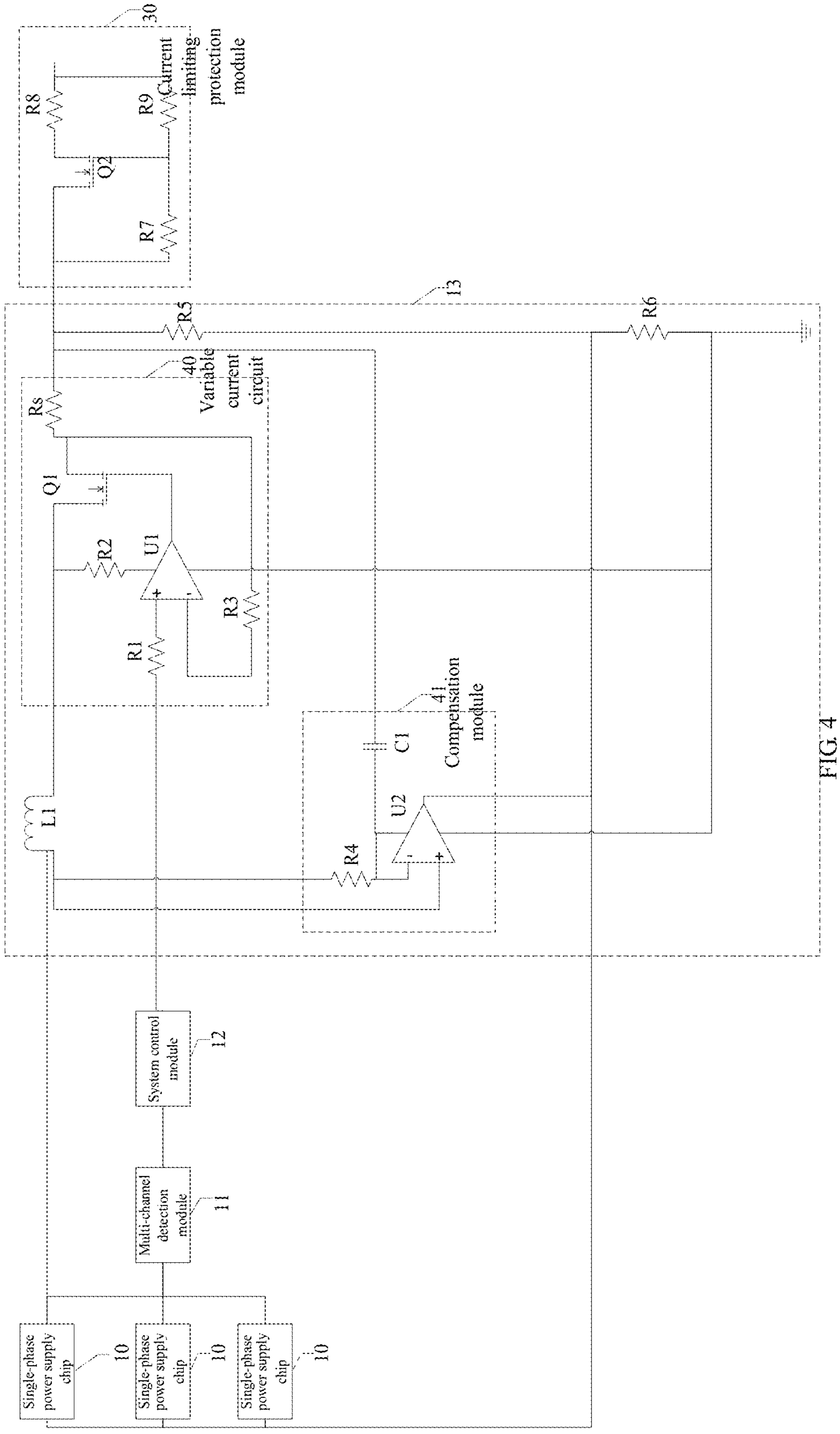
FIG. 4 is a circuit diagram of the current output device provided in the present application.

FIG. 4 is a circuit diagram of the current output device provided in the present application. The current limiting protection module 30 shown in FIG. 4 includes a seventh resistor R7, an eighth resistor R8, a ninth resistor R9 and a second switch tube Q2.

A common terminal including a first terminal of the seventh resistor and a first terminal of the second switch tube serves as the input of the current limiting protection module. A second terminal of the seventh resistor is connected to a common terminal including a driving terminal of the second switch tube and a first terminal of the ninth resistor. A second terminal of the second switch tube is connected to a first terminal of the eighth resistor, and a common terminal including the second terminal of the eighth resistor and a second terminal of the ninth resistor serves as the output of the current limiting protection module.

When the current value of a single-phase power supply chip is close to the overcurrent protection value of that channel (which may be understood that the current of that channel reaches 0.9 times the overcurrent protection value and continuously increasing), the current limiting protection module will control the current of the single-phase power supply chip to maintain the current value unchanged, and send an alarm signal to CPLD to remind users that there is a problem with the current output device that requires to be diagnosed by technical personnel in time.

The purpose of the current limiting protection module is to limit the continuous increase of the current in a certain single-phase power supply chip when the current value is abnormal, and prevent the single-phase power supply chip from overcurrent protection before the technician makes a diagnosis, which may cause the high-power loads to not operate normally. It should be noted that, during normal operation (which may be understood as, when the current is less than 0.9 times the overcurrent protection value), the input of the current limiting protection module provides the bias voltage of the second switch tube through the seventh resistor and the ninth resistor to ensure that the second switch tube is saturated and conductive, and the second switch tube has no control effect on the current. With the increase of current, the voltage on the eighth resistor gradually increases. When the voltage increases to a certain extent, the voltage on the eighth resistor is close to the bias voltage of the second switch tube, and the second switch tube begins to limit the flowing current to limit the current to 0.9 times the overcurrent protection value. It should be noted that in the embodiment, there is no limitation as to whether the first switch tube and the second switch tube are NMOS tubes or PMOS tubes. As an implementation in the embodiment of the present application, the first switch tube and the second switch tube may be set as NMOS tubes. In addition, types, resistance values and maximum current values of the seventh resistor, the eighth resistor and the ninth resistor are not limited. Their implementations are determined according to implementation scenarios.

In some embodiments of the present application, as shown in FIG. 4, the variable current compensation module 13 includes a variable current circuit 40, a compensation circuit 41, and an inductor L1.

A first terminal of the inductor is connected to an output pin of each single-phase power supply chip, a second terminal of the inductor is connected to the first input of the variable current circuit, a second input of the variable current circuit is connected to the system control module, an output of the variable current circuit is connected to a load, a first input of the compensation circuit is connected to an output pin of each single-phase power supply chip, a second input of the compensation circuit is connected to the first input of the variable current circuit, a first output of the compensation circuit is connected to the load, and a second output of the compensation circuit is connected to a feedback pin of each single-phase power supply chip. The compensation circuit is used to ensure that the output current value may provide timely and accurate feedback to current adjustment of each single-phase power supply chip.

The variable current circuit 40 includes a current sensing resistor Rs, a first resistor R1, a second resistor R2, a third resistor R3, a first switch tube Q1 and a first differential amplifier U1. A first terminal of the second resistor serves as the first input of the variable current circuit, a first terminal of the first resistor serves as the second input of the variable current circuit for receiving a reference voltage signal Vref, a second terminal of the first resistor is connected to a non-inverting input of the first differential amplifier, a second terminal of the second resistor is connected to a positive power supply terminal of the first differential amplifier, a negative power supply terminal of the first differential amplifier is grounded, a first terminal of the third resistor is connected to an inverting input of the first differential amplifier, a second terminal of the third resistor is connected to a second terminal of the first switch tube, an output of the first differential amplifier is connected to a driving terminal of the first switch tube, the first terminal of the second resistor is connected to a first terminal of the first switch tube, the second terminal of the first switch tube is connected to a first terminal of the current sensing resistor, and a second terminal of the current sensing resistor serves as the output of the current variable current circuit for receiving the output voltage Vout.

The current flowing through the first switch tube may be calculated based on the reference voltage signal, the output voltage and the current detecting resistance. The current is denoted as I, I=(Vref−Vout)/Rs. Because of the clamping characteristic of the first switch tube, the current is always maintained around the value of (Vref−Vout)/Rs. It should be noted that the change amplitude of the current does not exceed 0.1 I. It should be noted that, as an embodiment, the resistance of the first resistor and the third resistor is required to be large resistance of 10K or more, in order to ensure that the current of the branch where the first resistor and the third resistor are located does not affect the output current value. The second resistor serves as a pull-up resistor to provide a bias voltage for the first switch tube, so that the first switch tube operates in a variable resistance area, and limit the current through the first switch tube based on the clamping characteristics of the first switch tube. The type, resistance value and maximum current value of the second resistor are not limited, and its implementation may be determined according to implementation scenarios.

The compensation circuit 41 includes a fourth resistor R4, a capacitor C1 and a second differential amplifier U2. A non-inverting input of the second differential amplifier serves as the first input of the compensation circuit, a first terminal of the fourth resistor serves as the second input of the compensation circuit, a common terminal including an inverting input of the second differential amplifier, a negative power supply terminal of the second differential amplifier and a first terminal of the capacitor is connected to a second terminal of the fourth resistor, a positive power supply terminal of the second differential amplifier is connected to a second terminal of the capacitor, the second terminal of the capacitor serves as the first output of the compensation circuit, and an output of the second differential amplifier serves as the second output of the compensation circuit.

The compensation circuit is configured for rapidly feedbacking the current change to the second output, to add an additional compensation for the second output. The compensation circuit uses RC low-pass filtering principle to obtain additional feedback ripples. The fourth resistor and the capacitor in the circuit form a first-order filter. The filtered output voltage serves as a negative electrode of an operational amplifier, and the second input before filtering serves as a positive electrode of the operational amplifier. The difference between the two may be obtained, which may be understood as the voltage to be compensated when the current on the inductor changes rapidly.

The variable current compensation module also includes a fifth resistor R5 and a sixth resistor R6. A first terminal of the fifth resistor is connected to a common terminal including the output of the variable current circuit and the first output of the compensation circuit, a second terminal of the fifth resistor is connected to the first terminal of the sixth resistor, the first terminal of the sixth resistor is connected to the second output of the compensation circuit, and a second terminal of the sixth resistor is grounded. In the compensation circuit, the compensation voltage generated between the positive and negative terminals of the second differential amplifier is a compensation for the feedback voltage between the fifth resistor and the sixth resistor. When a pull-up current of the inductor is adjusted, the output voltage changes too fast. The feedback voltage between the fifth resistor and the sixth resistor will lag behind the change of real voltage, and an additional compensation voltage is required.

Figure 5:
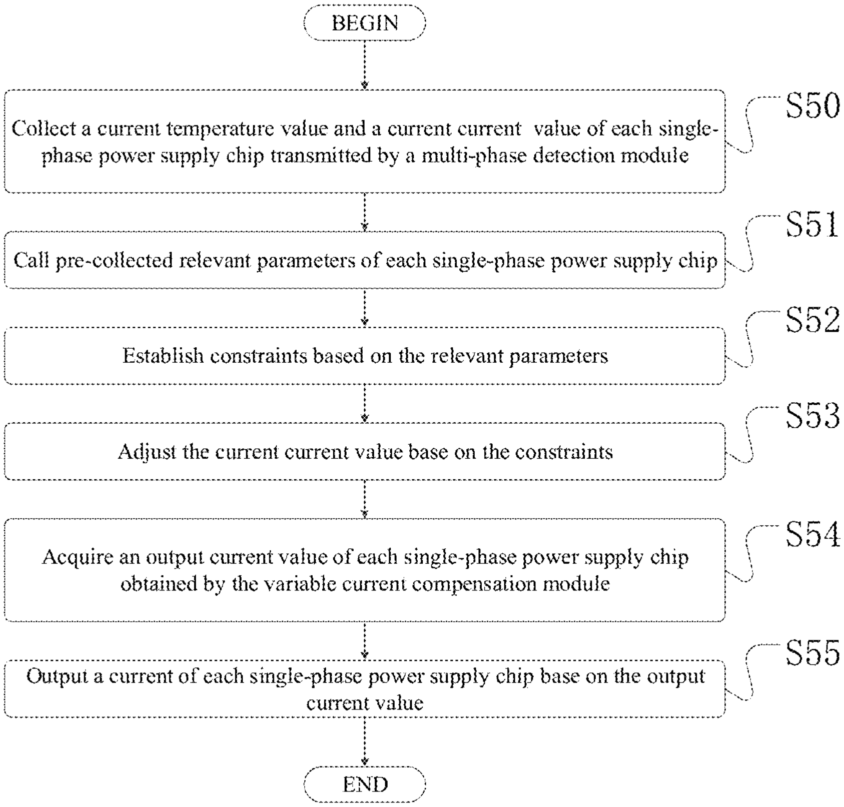
FIG. 5 is a flowchart of a current output method provided in an embodiment of the present application.

FIG. 5 is a flowchart of a current output method provided in an embodiment of the present application. In order to solve the above technical problem, the present application also provides a current output method, which is applied to the above current output device. As shown in FIG. 5, the method includes S50-S55.

In S50, a current temperature value and a current current value of a single-phase power supply chip transmitted by the multi-channel detection module are collected.

A plurality of single-phase power supply chips are provided, and at least one single-phase power supply chip is of a type different from the other single-phase power supply chips.

In S51, pre-collected relevant parameters of each single-phase power supply chip are called.

The relevant parameters include at least a rated temperature value and a rated current value, and may also include junction temperature and thermal resistance of each single-phase power supply chip, Vds of MOS tubes, SOA characteristics of MOS tubes, load voltage, load current, etc. In the embodiment, CPLD receives a digital signal transmitted by the multi-channel detection module and obtains the current temperature value and junction temperature of each single-phase power supply chip at this moment. The current temperature value is denoted as T1, and the junction temperature is denoted as Tθ. The thermal state Q in the system may be calculated by the formula $Q=(T1+\Delta T\theta)/T\theta$, where ΔTθ is temperature rise of the system with the increase of current. According to the above formula, a thermal state of each single-phase power supply chip is obtained, and all thermal states are sorted. The sorting order can be in descending order of thermal states, or it can be the order of collecting each single-phase power supply chip. This order can be customized according to the implementation scenario. In the embodiment, the order is not limited. It should be noted that ΔTθ is calculated according to the formula $\Delta T\theta=Pd*\theta j=[(Vin-Vout)*\Delta I]*\theta j$, where Pd is power consumption corresponding to each single-phase power supply chip, and θj is thermal resistance corresponding to each single-phase power supply chip.

In S52, a constraint is established based on the relevant parameters.

Since the current output device includes a plurality of single-phase power supply chips of different types, the following explanation is given as an example of the current output device including three different types of single-phase power supply chips:

According to the above formula $Q=(T1+\Delta T^{\theta})/T^{\theta}$, thermal states of three different types of single-phase power supply chips are obtained, respectively, and denoted as Q1, Q2 and Q3, and the thermal states sorted in order of magnitude are also denoted as Q1, Q2 and Q3. The currents flowing through the three different types of single-phase power supply chips are respectively denoted as I1, I2 and I3. The constraints are $Q1-Q2=0$, $Q2-Q3=0$ and $I1+I2+I3=I$, respectively.

In S53, the current current value is adjusted based on the constraint.

The optimal algorithm for adjusting the current current value generally adopts a genetic algorithm. The steps of the genetic algorithm are as follows:

- initializing a population of optimization variables based on initial variable parameters (which may be the current temperature value and the current current value in the embodiment);
- performing a selection crossover operation on the population;
- determining whether the population fitness satisfies a termination condition;
- if no, returning to the step of performing the selection crossover operation on the population;
- if yes, outputting the population of optimization variables.

In S54, an output current value of each single-phase power supply chip obtained by the variable current compensation module is acquired.

In S55, a current of each single-phase power supply chip is output based on the output current value.

In the above method, regardless of whether the types of the plurality of single-phase power supply chips are the same, the system control module obtains the current temperature value and current current value through the multi-channel detection module, adjusts the current current value based on the constraint, obtains an output current value of each single-phase power supply chip through the variable current compensation module, and outputs a current equal to the output current value. When a plurality of single-phase power supply chips in parallel are used to supply power to high-power loads, user experience may be improved without being restricted by usage scenarios even if types of power supply chips are different.

In the above embodiments, the current output method is described in detail, and the present application also provides corresponding embodiments of the current output system. It should be noted that the present application describes the embodiments of the apparatus from two perspectives, one is based on the perspective of a functional module, and the other is based on the perspective of hardware.

Figure 6:
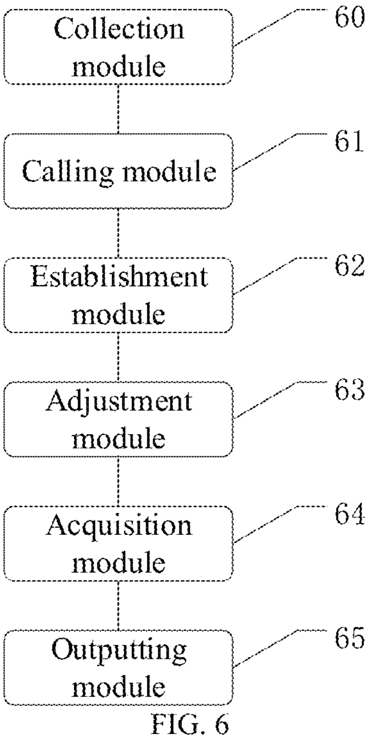
FIG. 6 is a structure diagram of a current output apparatus provided by an embodiment of the present application.

FIG. 6 is a structure diagram of a current output apparatus provided in an embodiment of the present application. As shown in FIG. 6, the present application also provides a current output apparatus, including:

- a collection module 60 configured for collecting a current temperature value and a current current value of each single-phase power supply chip transmitted by the multi-channel detection module, where a plurality of single-phase power supply chips are provided, and at least one of the plurality of single-phase power supply chips is of a type different from other single-phase power supply chips;
- a calling module 61 configured for calling pre-collected relevant parameters of each single-phase power supply chip, where the relevant parameters at least include a rated temperature value and a rated current value;
- an establishment module 62 configured for establishing a constraint based on the relevant parameters;
- an adjustment module 63 configured for adjusting the current current value based on the constraint;
- an obtaining module 64 configured for obtaining an output current value of each single-phase power supply chip obtained by the variable current compensation module; and
- an output module 65 configured for outputting a current of each single-phase power supply chip based on the output current value.

Regardless of whether the types of the plurality of single-phase power supply chips are the same, the system control module obtains the current temperature value and current current value through the multi-channel detection module, adjusts the current current value based on the constraint, obtains an output current value of each single-phase power supply chip through the variable current compensation module, and outputs a current equal to the output current value. When a plurality of single-phase power supply chips in parallel are used to supply power to high-power loads, user experience may be improved without being restricted by usage scenarios even if types of power supply chips are different.

Since embodiments of the apparatus correspond to the embodiments of the method, please refer to the description of the embodiments of the method for the embodiments of the apparatus, which will not be repeated here.

Figure 7:
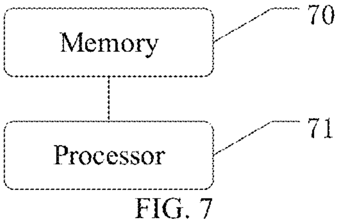
FIG. 7 is a structure diagram of a current output system provided in an embodiment of the present application.

FIG. 7 is a structure diagram of a current output system provided in an embodiment of the present application. As shown in FIG. 7, the current output system includes:

a memory 70 configured for storing a computer program; and a processor 71 configured for implementing steps of the current output method in the above embodiments when executing the computer program.

The current output system provided in the embodiment may include, but is not limited to, a smart phone, a tablet computer, a notebook computer or a desktop computer.

The processor 71 may also include a main processor and a co-processor. The main processor is a processor used to process data in the wake-up state, also called a central processing unit (CPU); the co-processor is A low-power processor used to process data in standby mode. In some embodiments, the processor 71 may be integrated with a graphics processing unit (GPU), and the GPU is responsible for rendering and drawing content to be displayed on the display screen. In some embodiments, the processor 71 may also include an artificial intelligence (AI) processor, which is used to process computing operations related to machine learning.

The processor 71 may include one or more processing cores, such as a 4-core processor, an 8-core processor, etc. The processor 71 may be implemented in at least one hardware form of digital signal processing (DSP), field-programmable gate array (FPGA) and programmable logic array (PLA). The processor 71 may also include a main processor and a co-processor. The main processor is a processor for processing data in a wake-up state, and also called a central processing unit (CPU). The co-processor is a low-power processor for processing data in a standby state. In some embodiments, the processor 71 may be integrated with a graphics processing Unit (GPU) which is responsible for rendering and drawing content to be displayed on the display screen. In some embodiments, the processor 71 may also include an artificial intelligence (AI) processor, which is used to process computing operations related to machine learning.

The memory 70 may include one or more non-transitory computer-readable storage media, which may be non-transitory. The memory 70 may also include a high-speed random access memory and a non-transitory memory, such as one or more disk storage devices, flash memory storage devices, etc. In the embodiment, the memory 70 is used to store at least the following computer program which, after being loaded and executed by the processor 71, may implement relevant steps of the current output method disclosed in any of the preceding embodiments. In addition, the resources stored in the memory 70 may also include an operating system, data, etc., and the storage may be transient storage or permanent storage. The operating system may include Windows, Unix, Linux, etc. The data may include, but is not limited to, the current output method, etc.

In some embodiments, the current output system may further include a display screen, an input/output interface, a communication interface, a power supply, and a communication bus.

Those skilled in the art may understand that the structure shown in FIG. 7 does not constitute a limitation on the current output system, and may include more or fewer components than shown.

The current output system provided in the embodiment of the present application includes a memory 70 and a processor 71. The processor 71 may implement the current output method when executing a program stored in the memory 70.

Regardless of whether the types of the plurality of single-phase power supply chips are the same, the system control module obtains the current temperature value and current current value through the multi-channel detection module, adjusts the current current value based on the constraint, obtains an output current value of each single-phase power supply chip through the variable current compensation module, and outputs a current equal to the output current value. When a plurality of single-phase power supply chips in parallel are used to supply power to high-power loads, user experience may be improved without being restricted by usage scenarios even if types of power supply chips are different.

Finally, the present application also provides an embodiment corresponding to a non-transitory computer-readable storage medium storing a computer program which implement steps recited in the above method embodiments when executed by the processor.

It may be understood that the method in the above embodiment may be stored in a computer-readable storage medium if it is implemented in the form of a software functional unit and sold or used as a separate product. Based on this understanding, the part of the technical solution of the present application that essentially contributes to the conventional technology or all or part of the technical solution may be embodied in the form of a software product that is stored in a storage medium and implements all or part of steps of the methods of the various embodiments of the present application. The above storage medium includes: a USB flash drive, a mobile hard disk, a read-only memory (ROM), a random access memory (RAM), a magnetic disk, or an optical disk, and other media that may store program code.

Regardless of whether the types of the plurality of single-phase power supply chips are the same, the system control module obtains the current temperature value and current current value through the multi-channel detection module, adjusts the current current value based on the constraint, obtains an output current value of each single-phase power supply chip through the variable current compensation module, and outputs a current equal to the output current value. When a plurality of single-phase power supply chips in parallel are used to supply power to high-power loads, user experience may be improved without being restricted by usage scenarios even if types of power supply chips are different.

The current output device, method, apparatus, system and medium provided in the present application have been introduced in detail above. Various embodiments in this specification are described in a progressive manner, and each embodiment focuses on the differences with other embodiments. The same or similar parts of various embodiments can be referred to each other. As for the apparatus disclosed in the embodiment, since it corresponds to the method disclosed in the embodiment, the description is relatively simple. For relevant details, please refer to the description in the method section. It should be noted that for those of ordinary skill in the art, several improvements and modifications can be made to the present application without departing from the principles of the present application, and these improvements and modifications also fall within the protection scope of the claims of the present application.

It should also be noted that in this specification, relational terms such as first and second are used only to distinguish one entity or operation from another entity or operation without necessarily requiring or implying any such actual relationship or order between these entities or operations. Moreover, the term "including", "containing" or any other variant is intended to cover non-exclusive inclusion, so that a process, a method, an articles, or a device that includes a series of elements includes not only those elements, but also other elements that are not clearly listed, or also includes the inherent elements of the process, method, articles or device. Without more restrictions, the limited elements by the sentence "includes a . . . " do not exclude that there are other same elements in the process, method, article, or device that include the elements.

The invention claimed is:

1. A current output device, comprising a plurality of single-phase power supply chips (10), a multi-channel detection module (11), a system control module (12) and a variable current compensation module (13), wherein:

the multi-channel detection module (11) is connected to temperature pins and current pins of the plurality of single-phase power supply chips (10), and is configured for transmitting current temperature values and current current values of the plurality of single-phase power supply chips (10), and at least one of the plurality of single-phase power supply chips (10) is of a type different from the other single-phase power supply chips (10);

one end of the system control module (12) is connected to the multi-channel detection module (11), and is configured for obtaining the current temperature values and the current current values, obtaining constraints based on pre-collected relevant parameters and adjusting the current current values based on the constraints, and the variable current compensation module (13) is connected to the other end of the system control module (12), and is configured for obtaining an output current value of each single-phase power supply chip (10) based on the current current values, and outputting a current of each single-phase power supply chip (10) based on the output current value;

wherein the variable current compensation module (13) comprises a variable current circuit (40), a compensation circuit (41) and an inductor, a first terminal of the inductor is connected to an output pin of each single-phase power supply chip (10), a second terminal of the inductor is connected to a first input of the variable current circuit (40), a second input of the variable current circuit (40) is connected to an output pin of each single-phase power supply chip (10), an output of the variable current circuit (40) is connected to a load, a first input of the compensation circuit (41) is connected to an output pin of each single-phase power supply chips (10), a second input of the compensation circuit (41) is connected to the first input of the variable current circuit (40), the first output of the compensation circuit (41) is connected to the load, and a second output of the compensation circuit (41) is connected to a feedback pin of each single-phase power supply chip (10).

2. The current output device according to claim 1, wherein the variable current circuit (40) comprises a current sensing resistor, a first resistor, a second resistor, a third resistor, a first switch tube and a first differential amplifier, a first terminal of the second resistor serves as the first input of the variable current circuit (40), a first terminal of the first resistor serves as the second input of the variable current circuit (40), a second terminal of the first resistor is connected to a non-inverting input of the first differential amplifier, a second terminal of the second resistor is connected to a positive power supply terminal of the first differential amplifier, a negative power supply terminal of the first differential amplifier is grounded, a first terminal of the third resistor is connected to an inverting input of the first differential amplifier, a second terminal of the third resistor is connected to a second terminal of the first switch tube, an output of the first differential amplifier is connected to a driving terminal of the first switch tube, the first terminal of the second resistor is connected to a first terminal of the first switch tube, the second terminal of the first switch tube is connected to a first terminal of the current sensing resistor, and a second terminal of the current sensing resistor serves as the output of the variable current circuit (40).

3. The current output device according to claim 1, wherein the compensation circuit (41) comprises a fourth resistor, a capacitor and a second differential amplifier, a non-inverting input of the second differential amplifier serves as the first input of the compensation circuit (41), a first terminal of the fourth resistor serves as the second input of the compensation circuit (41), a common terminal formed by an inverting input of the second differential amplifier, a negative power supply terminal of the second differential amplifier and a first terminal of the capacitor is connected to a second terminal of the fourth resistor, a positive power supply terminal of the second differential amplifier is connected to a second terminal of the capacitor, the second terminal of the capacitor serves as the first output of the compensation circuit (41), and an output of the second differential amplifier serves as the second output of the compensation circuit (41).

4. The current output device according to claim 1, further comprising a fifth resistor and a sixth resistor, a first terminal of the fifth resistor is connected to a common terminal formed by the output of the variable current circuit (40) and the first output of the compensation circuit (41), a second terminal of the fifth resistor is connected to a first terminal of the sixth resistor, a first terminal of the sixth resistor is connected to the second output of the compensation circuit (41), and a second terminal of the sixth resistor is grounded.

5. The current output device according to claim 1, further comprising a current limiting protection module (30), an input of the current limiting protection module (30) is connected to an output of the variable current compensation module (13), and an output of the current limiting protection module (30) is connected to a load.

6. The current output device according to claim 2, wherein the current limiting protection module (30) comprises a seventh resistor, an eighth resistor, a ninth resistor and a second switch tube, a common terminal formed by a first terminal of the seventh resistor and a first terminal of the second switch tube serves as the input of the current limiting protection module (30), a second terminal of the seventh resistor is connected to a common terminal formed by a driving terminal of the second switch tube and a first terminal of the ninth resistor, a second terminal of the second switch tube is connected to a first terminal of the eighth resistor, a common terminal formed by a second terminal of the eighth resistor and a second terminal of the ninth resistor serves as the output of the current limiting protection module (30).

7. The current output device according to claim 6, wherein the first switch tube and the second switch tube operate in a safe operating area.

8. A current output method applied to the current output device according to claim 1, wherein the method comprises:

collecting a current temperature value and a current current value of each single-phase power supply chip transmitted by the multi-channel detection module, wherein a plurality of single-phase power supply chips are provided, and at least one of the plurality of single-phase power supply chips is of a type different from the other single-phase power supply chips;

calling pre-collected relevant parameters of each single-phase power supply chip, wherein the relevant parameters at least comprise a rated temperature value and a rated current value;

establishing a constraint based on the relevant parameters;

adjusting the current current value based on the constraint;

acquiring an output current value of each single-phase power supply chip obtained by the variable current compensation module; and outputting a current of each single-phase power supply chip based on the output current value;

wherein the variable current compensation module comprises a variable current circuit, a compensation circuit and an inductor, a first terminal of the inductor is connected to an output pin of each single-phase power supply chip, a second terminal of the inductor is connected to a first input the variable current circuit, a second input of the variable current circuit is connected to the system control module, an output of the variable current circuit is connected to a load, a first input of the compensation circuit is connected to an output pin of each single-phase power supply chip, a second input of the compensation circuit is connected to the first input of the variable current circuit, a first output of the compensation circuit is connected to the load, and a second output of the compensation circuit is connected to a feedback pin of each single-phase power supply chip.

9. The current output method according to claim 8, wherein the compensation circuit comprises a fourth resistor, a capacitor and a second differential amplifier, a non-inverting input of the second differential amplifier serves as the first input of the compensation circuit, a first terminal of the fourth resistor serves as the second input of the compensation circuit, a common terminal formed by an inverting input of the second differential amplifier, a negative power supply terminal of the second differential amplifier and a first terminal of the capacitor is connected to a second terminal of the fourth resistor, a positive power supply terminal of the second differential amplifier is connected to a second terminal of the capacitor, a second terminal of the capacitor serves as the first output of the compensation circuit, and an output of the second differential amplifier serves as the second output of the compensation circuit.

10. The current output method according to claim 8, wherein the establishing the constraint based on the relevant parameters comprises:

determining a current difference value based on the rated current value and the current current value;

determining a temperature difference value of each single-phase power supply chip based on the a resistance value and the current difference value, wherein the relevant parameters further comprise a resistance value of each single-phase power supply chip;

determining a current thermal value of each single-phase power supply chip based on the temperature difference value and the current temperature value; and determining the constraint based on the current thermal value.

11. The current output method according to claim 8, wherein the establishing the constraint based on the relevant parameters comprises:

adding up current current values of the plurality of single-phase power supply chip to obtain a total current value; and determining the constraint based on the total current value.

12. The current output method according to claim 8, wherein after the calling pre-collected relevant parameters of each single-phase power supply chip, and before the establishing the constraint based on the relevant parameters, the method further comprises:

controlling a first switch tube and a second switch tube to operate in a safe operating area.

13. The current output method according to claim 10, wherein after the determining the current heat value of each single-phase power supply chip based on the temperature difference value and the current temperature value, and before the determining the constraint based on the current heat value, the method further comprises:

sorting current thermal values in a predetermined order.

14. A current output system, comprising:

a memory configured for storing a computer program; and a processor configured for executing the computer program to implement steps of the current output method according to claim 8.

15. A non-transitory computer-readable storage medium, wherein the non-transitory computer-readable storage medium stores a computer program which, when executed by a processor, implements steps of the current output method according to claim 8.

16. A current output apparatus, comprising:

a collection module configured for collecting a current temperature value and a current current value of each single-phase power supply chip transmitted by a multi-channel detection module, wherein a plurality of single-phase power supply chips are provided, and at least one of the plurality of single-phase power supply chips is of a type different from the other single-phase power supply chips;

a calling module configured for calling pre-collected relevant parameters of each single-phase power supply chip, wherein the relevant parameters at least comprise a rated temperature value and a rated current value;

an establishment module configured for establishing a constraint based on the relevant parameters;

an adjustment module configured for adjusting the current current value based on the constraint;

an obtaining module configured for obtaining an output current value of each single-phase power supply chip obtained by a variable current compensation module; and an output module configured for outputting a current of each single-phase power supply chip based on the output current value;

wherein the variable current compensation module comprises a variable current circuit, a compensation circuit and an inductor, a first terminal of the inductor is connected to an output pin of each single-phase power supply chip, a second terminal of the inductor is connected to the first input of the variable current circuit, a second input of the variable current circuit is connected to the system control module, an output of the variable current circuit is connected to a load, a first input of the compensation circuit is connected to an output pin of each single-phase power supply chip, a second input of the compensation circuit is connected to the first input of the variable current circuit, a first output of the compensation circuit is connected to the load, and a second output of the compensation circuit is connected to a feedback pin of each single-phase power supply chip.

17. The current output apparatus according to claim 16, wherein the compensation circuit comprises a fourth resistor, a capacitor and a second differential amplifier, a non-inverting input of the second differential amplifier serves as the first input of the compensation circuit, a first terminal of the fourth resistor serves as the second input of the compensation circuit, a common terminal formed by an inverting input of the second differential amplifier, a negative power supply terminal of the second differential amplifier and a first terminal of the capacitor is connected to a second terminal of the fourth resistor, a positive power supply terminal of the second differential amplifier is connected to a second terminal of the capacitor, the second terminal of the capacitor serves as the first output of the compensation circuit, and an output of the second differential amplifier serves as the second output of the compensation circuit.

* * * * *